(12) United States Patent
Henderson et al.

(10) Patent No.: US 6,380,661 B1
(45) Date of Patent: Apr. 30, 2002

(54) LINEAR INCREMENTAL BI-DIRECTIONAL MOTOR

(75) Inventors: David A. Henderson, Farmington; John C. Fasick, III, Lima; Qin Xu, Fairport, all of NY (US)

(73) Assignee: Burleigh Instruments, Inc., Fishers, NY (US)

( * ) Notice: Subject to any disclaimer, the term of this patent is extended or adjusted under 35 U.S.C. 154(b) by 0 days.

(21) Appl. No.: 09/873,629

(22) Filed: Jun. 4, 2001

Related U.S. Application Data
(60) Provisional application No. 60/209,367, filed on Jun. 5, 2000.

(51) Int. Cl.[7] .............................................. H01L 41/08
(52) U.S. Cl. ................................... 310/323.02; 310/328
(58) Field of Search ........................... 310/328, 323.01, 310/323.02

(56) References Cited

U.S. PATENT DOCUMENTS 4,570,096 A * 2/1986 Hara et al. .................. 310/328
5,101,132 A * 3/1992 Yamaguchi ............ 310/323.02
5,786,654 A * 7/1998 Yoshida et al. ............. 310/328

OTHER PUBLICATIONS

Chen, Kim & Carmen, "Mesoscale Actuator Device: Micro Interlocking Mechanism to Transfer Microload", Sensors and Actuators, v. 73 (1999) pp. 30–36.
Patent 3,902,084, May, Jr., William G., Aug. 26, 1975.
Patent 3,902,085, Bizzigotti, Richard A., Aug. 26, 1975.
Patent 4,709,183, Lange, Jurgen, Nov. 24, 1987.
Patent 5,319,257, McIntyre, Timothy J., Jun. 7, 1994.

* cited by examiner

*Primary Examiner*—Mark O. Budd

(57) ABSTRACT

A compact linear bi-directional motor is driven by one or more induced strain actuators, such as piezoelectric actuators, fabricated in its preferred embodiment using MEMS technology and incorporating a plurality of multi-clamps that alternately engage, forced by electrically energized auxiliary actuators, the rails or micro-ridges located on the base of the motor, on which they ride. This function is synchronized with energizing of the main actuator that alternately extends and contracts causing incremental motion of the multi-clamp assembly. An external load can be attached through a shaft to the multi-clamp assembly or the base.

20 Claims, 4 Drawing Sheets

LINEAR INCREMENTAL BI-DIRECTIONAL MOTOR

This application claims priority to our provisional U.S. application 60-209,367 filed Jun. 5, 2000. The U.S. Government has rights in this application under contract NAS1-99080.

FIELD OF INVENTION

Linear bi-directional incremental motors, and particulary such a motor having bi-directional clamps.

BACKGROUND OF INVENTION

There exists an increasing need for compact linear motors for applications in precise positioning and movement of devices and components in diverse fields, such as optics, microscopy, avionics, spacecraft, medicine, analytical instruments, and others. A large number of devices designed to accomplish these tasks have been proposed; however, none is available that combines very small size, light weight, moderate speed, high precision and accuracy, with high force and power. This invention describes such a linear motor.

One such device is the Inchworm® actuator (U.S. Pat. No. 3,902,084 and 3,902,085), which uses a piezoelectric driver to generate incremental microscopic displacements of a drive shaft. This device relies on friction to move the drive shaft backward and forward between the movements. The available push force therefore is limited by the frictional force resulting from the force normal to the drive shaft, generated by the piezoelectric strain the drive shaft. The Inchworm actuator also has a limited range of displacement and a relatively slow speed.

Recently, a group at the University of California at Los Angeles has described and demonstrated a linear incremental actuator (MAD) in which MEMS fabrication methods are used to produce mechanical teeth with micrometer-scale dimensions. This actuator is capable of generating large push forces. See, Chen, Q., Kim, C. J., and Carman, G. P., "Mesoscale Actuator Device: Micro Interlocking Mechanism to Transfer Microload", Sensors and Actuators, v. 73 (1999), pp. 30–36. The addition of the teeth to the Inchworm actuator has in fact dramatically improved the holding force of the device vs. the original Inchworm design.

U.S. Pat. No. 4,709,183 discloses a flat piezoelectric linear motor that functions similarly to the Inchworm actuator mentioned above in that the moving member is alternately clamped and unclamped in synchronism with the expansion and contraction of a piezoelectric actuator. The holding force relies on friction between the stationary and the moving smooth surface parts of the motor. Hence, this motor is also capable of only very limited push force restricted by the magnitude of the frictional force and the applied clamping force.

U.S. Pat. No. 5,319,257 describes a "Unitaxial Constant Velocity Microactuator". The device in accordance with the invention also uses piezoelectric clamps and actuators operating on a drive shaft passing through a bore in the housing of the motor. As in the above noted patents, this device also relies on friction between the surface of the drive shaft and the clamping units leading to the same limitations in push force.

One device, for which a patent application was filed by two of the inventors hereof, overcomes the force, power and speed limitations of prior art devices by replacing the previously used active-clamping devices with a passive ratchet mechanism. The result is that the force, speed, and power density, i.e., power per unit weight, are all significantly increased vs. the Inchworm and similar products of similar size and weight. Its limitation, however, due to its mechanical configuration, is in that a delay in motion occurs when the direction of motion is changed, especially under load.

SUMMARY OF THE INVENTION

The linear incremental piezoelectric motor subject of this invention adopts the traditional Inchworm concept mentioned above, while utilizing a multi-clamp mechanism to significantly increase the holding force and the friction between the surface of the base/rail unit and the multi-clamping unit. Thus, the resulting push force is considerably increased using this concept in the device, subject of this invention. The motor in the preferred embodiment uses MEMS (Micro Electro Mechanical Systems) technology in its critical components, facilitating a small size while achieving large push force and making it an ideal candidate for compact, high power linear density motors. The speed of this motor is similar to traditional Inchworm and like devices. As compared to the above-mentioned ratchet based mechanisms, said motor works well when changing, under load, the direction of the motion because the interdigitated multi-clamp generates a bi-directional holding force. The key design feature of the motor, compared with the traditional Inchworm or similar devices, is the multi-clamp mechanism, which many times increases the contact surface area, since said contact area is the sum of contact surfaces between the base/rail unit and the multi-clamps. Consequently it is possible to generate a much greater friction and push force.

The actuators employed in these motors, the so-called Induced Strain Actuators, include piezoelectric, ferroelectric, electrostrictive, magnetostrictive, and thermally expansive devices that have high stiffness. High stiffness is important to maintain the accuracy and repeatability of the motion increments under a load. Such actuator can produce expansions of up to 100 micrometers and are ideal for the motor subject of this invention.

The operational parameters of this motor make it suitable for many applications where the Inchworm actuators and similar prior art devices, because of their performance characteristics, could not be used; where much higher force and higher power density are essential, as is the small size of the unit, and the capability of repeatable and highly accurate micro- or macro-positioning. Furthermore, the design provides the possibility of scaling up or down the size of said motor and trading its size and weight for some of the operational parameters. The use of MEMS technology for the critical rail/multi-clamp components in this motor also facilitates lower manufacturing cost.

In accordance with their size, three classes of motors are identified that are based on the basic clamping concept disclosed herein: MEMS (1 to 100 $\mu$m component dimensions), the preferred embodiment; meso class (100 $\mu$m to 1 mm); and macro class (>1 mm)

Accordingly, one object of this invention is to provide an improved linear incremental motor that incorporates a multi-clamp mechanism that converts the reciprocal motion of the main actuator into incremental forward or reverse motion which may be via a motor shaft, and more specifically such a motor which can use a piezoelectric main actuator, can use an electrostrictive main actuator, can use a magnetostrictive main actuator, can use a ferromagnetic man actuator, and/or which can use a thermally expansive main actuator.

Still another object of this invention is to provide a motor as in said one object where the multi-clamps to have means for rigidly clamping on the rails during clamp state and incrementally moving on the rails during release state.

Another object of this invention is to provide a motor as in said one object using multiple micro-ridges to serve as rails, and more specifically where both side surfaces of said micro-ridges are contacted by a base of the motor during the clamping process, whereby the resulting friction force is accordingly increased by twice the number of the micro-ridges or rails on the base.

A further object of this invention is to provide an incremental motor which can be made using micromachining technology to fabricate the micro-ridges and interdigitated high force multi-clamp mechanisms, enabling them to be of microscopic dimensions, while enabling in a larger version of said motor to be made using conventional machining, wire electro-discharge machining, and other manufacturing processes.

Still further object of this invention is to provide an improved symmetrical version of said motor with two sets of rails or micro-ridges.

A further object of this invention is to provide an incremental motor as per said one object having a bridge-like structure with two joints between the main actuator and the multi-clamps.

Yet another object of this invention is to provide an improved motor as per said one object which can be configured in several models differing in size, weight, operating characteristics, and applications.

DETAILED DESCRIPTION OF THE INVENTION

Depending on the dimensional embodiment of said motor, base 10 may either carry a plurality of macroscopic rails for the larger sizes of the motor or micro-ridges for the smaller, MEMS-like version of said motor. In the following description of the invention the term "rails" will be used where appropriate to refer to both the macroscopic rails and the micro-ridges.

Figure 1:
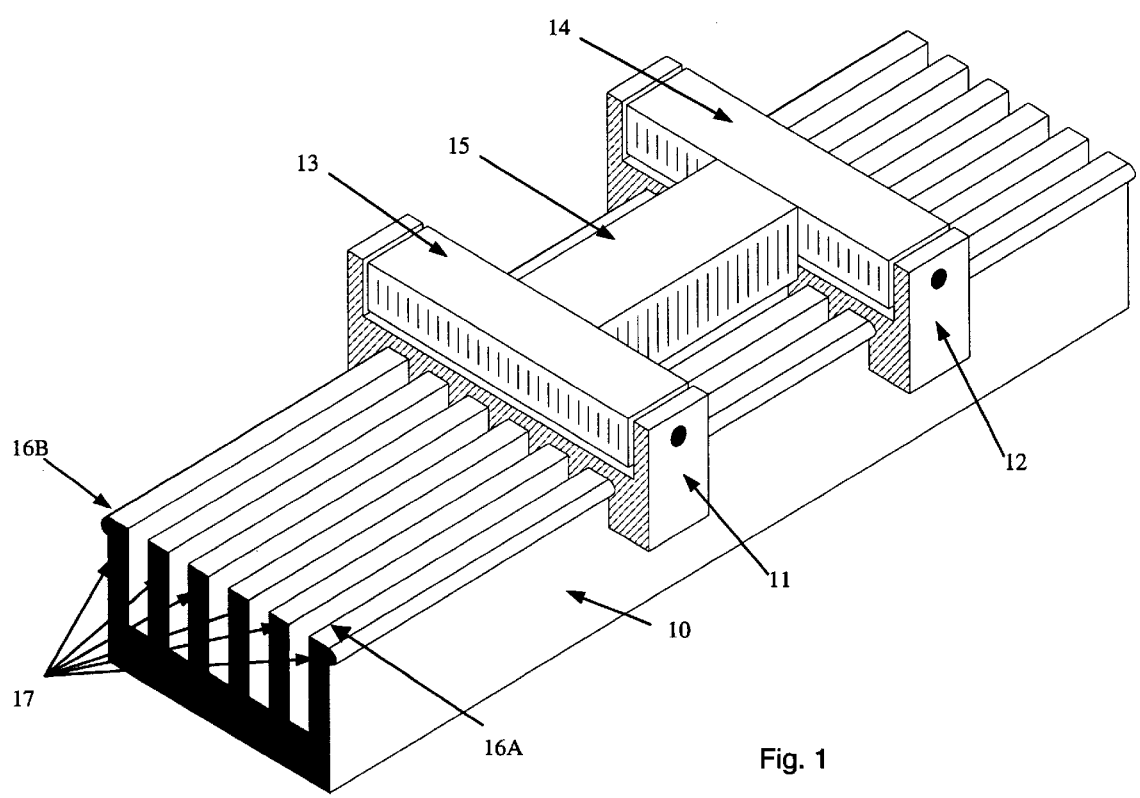
FIG. 1 is a perspective view providing a schematic presentation of one embodiment of the motor of this invention.

With reference to FIG. 1, which depicts one embodiment of said motor, the configuration is symmetrical with respect to the major and minor axes of the motor. The motor comprises six sections: the base section (the stationary part) 10 with rails 17, two multi-clamp assemblies 11 and 12 engaging said rails, two auxiliary actuators 13 and 14 which are affixed to the two multi-clamps 11 and 12, respectively, and one main actuator 15 which is in contact with the two multi-clamps/auxiliary actuators assemblies. This figure is intended only for conceptual illustration only, and the detailed design of the moving part of the motor assembly is not drawn here. In this version of the motor, the main actuator 15 and auxiliary actuators 13, 14 may be, but not limited to, piezoelectric actuators or electrostrictive actuators; both types are well known to those skilled in the art. For the smaller embodiments of the motor, the base and the multi-clamp are intended to be fabricated using MEMS technology. The larger embodiments may be made using machining, extrusion, or other conventional manufacturing processes. The multi-clamps and the base carry multiple rails, which are interdigitated at all times. The multi-clamps 11 and 12 can move or clamp on the rails 17 on the base 10, said rails being aligned parallel to the main axis of the motor.

The operational principle of the motor subject of this invention is similar to existing Inchworm devices mentioned earlier. The motion and push forces are created through sequential activation of the three actuators depicted in FIG. 1. When voltage is applied to auxiliary actuator 13, it extends and causes the multi-clamps 11 to forcefully clamp the rails 17. A voltage ramp is then applied to the main actuator 15, causing it, for example, to contract by a certain length. At the end of the voltage ramp, a voltage is applied to the auxiliary actuator 14, forcing multi-clamp 12 to clamp the rails 17; next, voltage is removed from the actuator 13, releasing the multi-clamp 11 from said rails. Next, a voltage ramp of opposite polarity is applied to the main actuator 15, causing it to extend. Now,.multi-clamp 11 lamps and multi-clamp 12 releases. The cycle can be repeated indefinitely so that multi-clamps 11 and 12 can advance in steps on the rails 17, resulting in a total range of motion only limited by the length of the motor.

The above sequence generates a forward motion of the motor. Changing the sequence of voltage ramp application to the main actuator 15 causes it to extend at the time when multi-clamp 11 is in its clamp state, and, with applied reverse polarity of said voltage ramp, to contract at the time when multi-clamp 12 is in clamp state, resulting in reverse motion.

In general, the external load is attached to the main actuator/multi-clamp assembly. However, it is understood that alternative geometries are also feasible, for instance, in which the load is attached to the base, while the main actuator/multi-clamp assembly is in a fixed position. For either design, the electric power is provided to all actuators through flexible conductors.

Figure 2A:
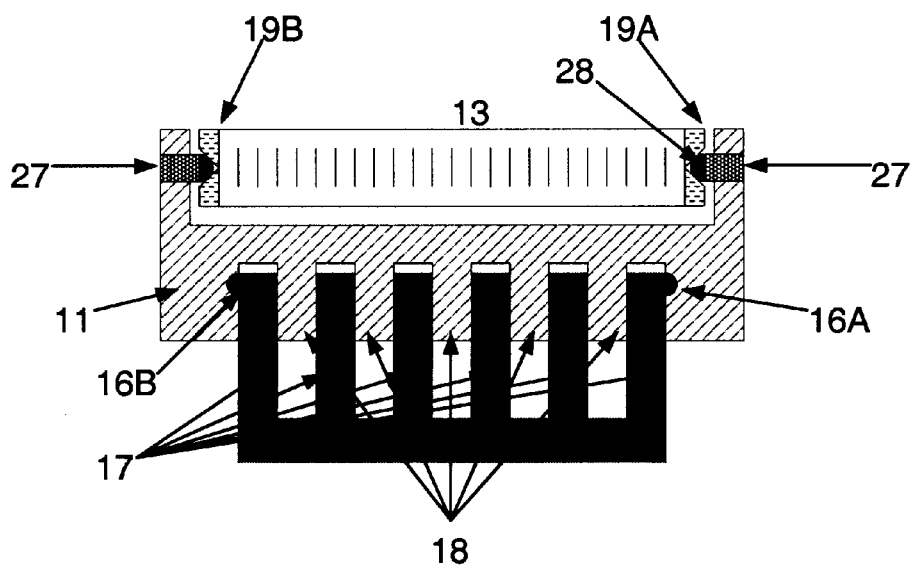
FIGS. 2A and 2B are schematic cross-sectional views of the multi-multi-clamps (the moving part, where the load force is generated) and the base (the stationary part) of the motor in FIG. 1 during release (2A) and clamp state (2B), respectively.
Figure 2B:
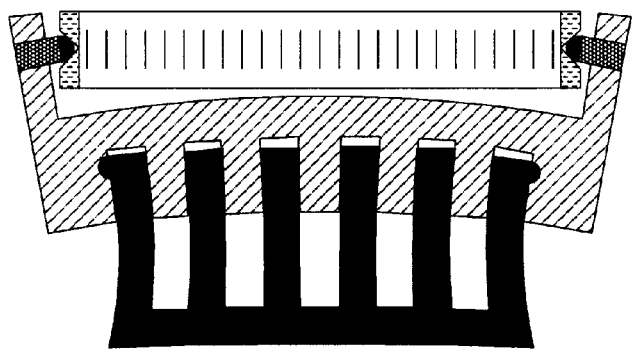

FIGS. 2A and 2B depict the cross-sectional views of the multi-clamps and the base of the motor shown in FIG. 1 during release state and clamp state, respectively. The auxiliary actuator 13 (shown here) is not rigidly attached to the multi-clamps 11. Rather, it contacts the multi-clamp through a set screws 27A and 27B, said screws have semi-spherical ends inserted into a depression in the end caps 19A and 19B on the auxiliary actuator 13. This arrangement allows said auxiliary actuator 13 to remain straight during its expansion while the multi-clamp 11 bends, thus preventing damage to the actuator caused by the lateral strain of the multi-clamp. Six rails 17 on the base and five rails 18 on the multi-clamp 11, which are interdigitated with the rails 17 on the base, are shown in FIGS. 1 and 2. It is understood that the illustrated number rails on said multi-clamps and said base only serves as an example because there can be any number of these components. The cross-sectional shape of these rails is not limited to what is shown in the figures. Said rails on the base are sufficiently long to allow for bending during clamping to prevent excessive stress and possible breakage. Said rails on the clamps are relatively short to ensure well-defined contact points with said rails on the base. The semi-cylindrical protrusions 16A and 16B on the two outside rails 17A and 17B of the base mesh into the corresponding channels in the bodies of the multi-clamps 11, 12. These protrusions ensure that the base 10 and the multi-clamps 11 and 12 hold together during release state.

An essential feature of this invention is in the utilization of the multi-clamps, which engage said multiple rails to overcome the limitation of the push force of the existing Inchworm or like devices. When the rails are in clamp state, i.e., the auxiliary actuator associated with one of the multi-clamps extends, as shown in FIG. 2B, the side-wall surfaces of the rails on both the base and those of the multi-clamps firmly contact each other under the compressive stress generated by the auxiliary actuator. Assuming that there are N rails on the base and that the normal force is comparable to that of the existing Inchworms, the available friction force or the push force is thus increased by 2N times. On microscopic scale, most materials, such as Si and metals will maintain their yield stress and fatigue strength. Therefore, it is expected that the multi-clamps and the entire motor will continue functioning over very long periods of time.

Figure 3A:
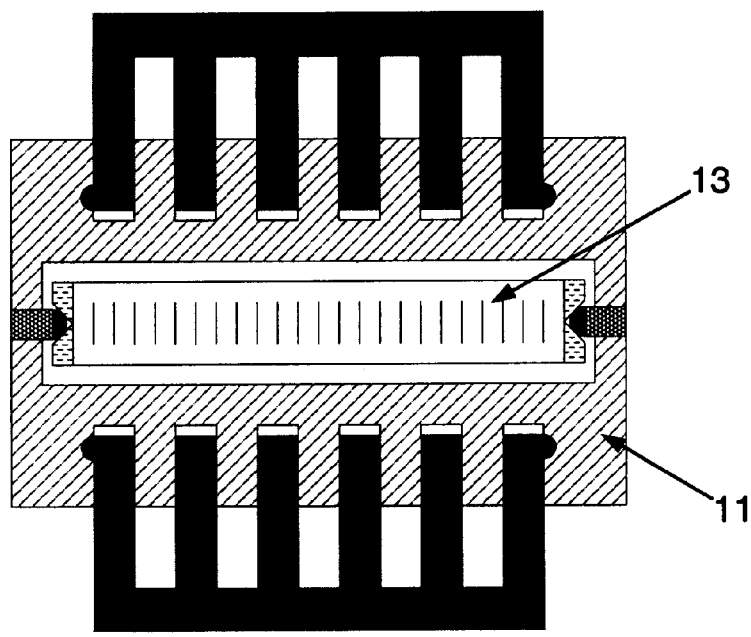
FIGS. 3A and 3B are schematic cross-sectional views across the auxiliary actuator (perpendicular to the main axis) for a symmetrical embodiment of the motor during release state (3A) and clamp state (3B), respectively.
Figure 3B:
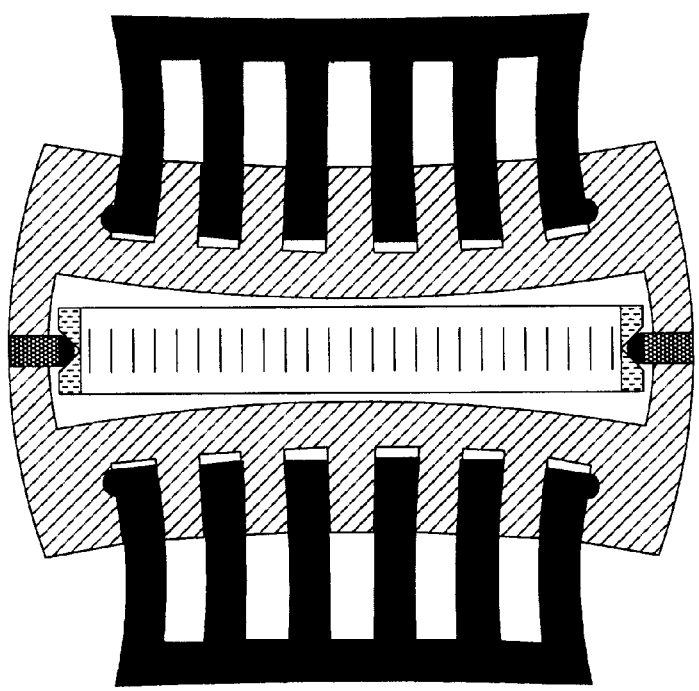

An alternative embodiment of this invention, which allows a further enhancement of said motor's, is illustrated in FIG. 3, showing a cross-sectional view across one of the auxiliary actuators (auxiliary actuator 13) for this kind of design, during its release state (3A) and clamp state (3B). The concept is to have symmetrical bases and multi-clamps on both the top and bottom of the main actuator (not shown here) and the auxiliary actuators, so that both sides share the same main actuator 15 and auxiliary actuators 13 and 14. The auxiliary actuator 13 contacts to the multi-clamp 11, through a set screw/boss/end caps arrangement as described above. This symmetrical design enables an easier and smoother operation of the motor, as well as greater push and holding forces.

Figure 4:
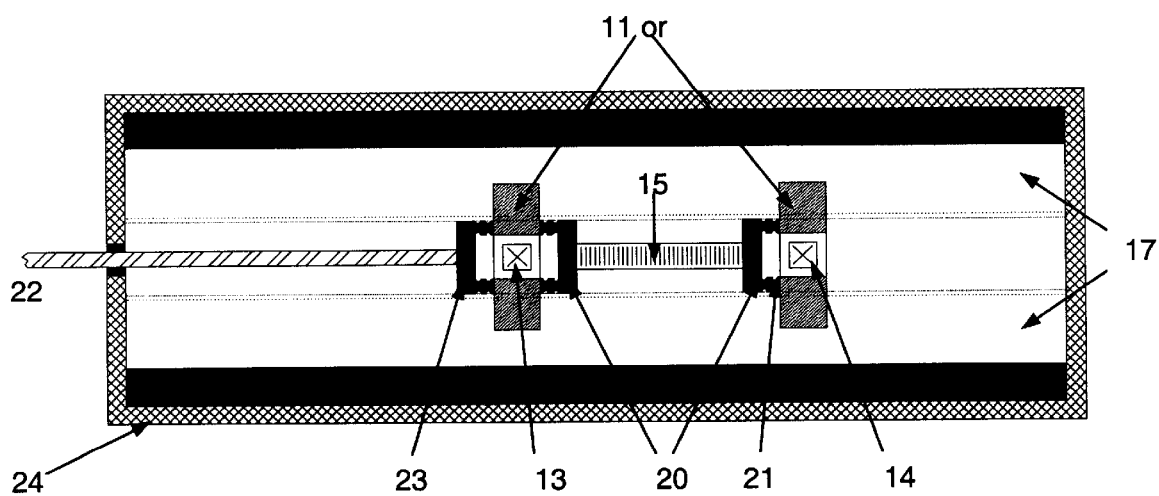
FIG. 4 is a side view of the motor of FIG. 1 from the right side.

A further improvement to the above-mentioned symmetrical design, is at the coupling junction between the main actuator 15 and the multi-clamps/auxiliary actuators, as shown in FIG. 4. The coupling junction takes advantage of a bridge-like structure 20, so that the main actuator 15 only transfers its force to the two multi-clamps 11 via two joints 21. The joints 21 are configured to be very stiff in the direction of the expansion of the main actuator along the main axis, but flexible in the direction normal to the main axis. During the operation of the motor when the main actuator 15 extends or contracts, the joints 21 are able to pass the push force directly to the multi-clamps without introducing shear stress to the multi-clamps in the perpendicular direction. The entire motor is contained in the enclosure 24 to which the base 10 is rigidly affixed. The push force is relayed through the shaft 22 to the external load. The connector 23 between the shaft 22 and the multi-clamps is a similar bridge structure referred to above, to provide better performance.

A variety of materials can be used to fabricate the microstructures; for example: silicon; various structural ceramics; metals, such as titanium or steel. The performance of such structures as rails and interdigitated multi-clamps can be enhanced by coating the operating surfaces with suitable materials, such as silicon nitride or diamond-like thin films, to reduce wear, increase strength, and facilitate sliding.

What is claimed is:

1. A linear incremental motor comprising
   at least one electrically actuated induced strain main actuator,
   at least two clamps each having a first set of rails,
   at least one base having a second set rails,
      said clamps being alternately electrically actuated by an auxiliary induced strain actuator in synchronism with said main actuator;
      said first set of rails being interdigitated with said second set of rails;
      said first and second sets of rails being parallel to each other and to the major axis of said motor, and said main actuator and said clamps with said auxiliary actuator are joined into a single assembly.

2. A linear incremental motor per claim 1 in which said auxiliary actuators when electrically actuated expand and cause said clamps to bend such that said first set of rails is forced against said second set of rails thus firmly clamping together said first set of rails and said second set of rails.

3. A linear incremental motor per claim 1 in which when the first said two clamps is actuated to cause said clamping of said first and second sets of rails the second of said two clamps is deactuated releasing said clamping, and when said first clamp is deactuated said second clamp is actuated causing clamping of said two sets of rails.

4. A linear incremental motor per claim 1 in which in response to a sequence of applied electrical potentials said main actuator expands and contracts in synchronism with the actuation and deactuation of said auxiliary actuators generates incremental of said assembly of said main actuator and said two auxiliary actuators motion in one direction with respect to said base.

5. A linear incremental motor per claim 4 in which when said sequence of applied electrical potentials is reversed with respect to the order of the sequence per claim 4, the motion of said assembly reverses.

6. A linear incremental motor per claim 1 in which said assembly moves along the second set of rails.

7. A linear incremental motor per claim 1 in which said main and said auxiliary actuator selected from the group consisting of piezoelectric actuators, electrostrictive actuators, magnetostrictive actuators, ferromagnetic actuators, thermally expansive actuators, and electromagnetic actuators.

8. A linear incremental motor per claim 1 in which said rails are microscopic ridges.

9. A linear incremental motor per claim 1 in which said auxiliary actuator in said clamps are each held in place by means of two set screws at each end of said auxiliary actuator, said set screws having hemispherically shaped ends.

10. A linear incremental motor per claim 1 in which said auxiliary actuator has an end cap, said end cap having a hemispherically shaped indentation on its surface facing away from said auxiliary actuator, said set screws fitting into said indentations.

11. A linear incremental motor per claim 1 in which two outermost rails of said second set of rails have along the length of their ridges protrusions having hemispherical cross-sections.

12. A linear incremental motor per claim 1 in which two outermost rails of said second set of rails have along the length of their ridges protrusions have cross-sections selected from the group consisting of rectangular cross-sections, triangular cross-sections, and trapezoidal cross-sections.

13. A linear incremental motor per claim 1 wherein said actuator and clamps compress the moving part of said motor and said base compresses the fixed part.

14. A linear incremental actuator per claim 13 further comprising a drive shaft connected to said moving parts.

15. A linear incremental motor per claim 1 in which the internal surfaces of two outermost rails of said first set of rails have grooves corresponding in shape to protrusions in said second set of rails, said protrusions fit into said grooves whereby said clamps are retained interdigitated with said second set of rails on said base irrespective of the orientation of said motor.

16. A linear incremental motor per claim 1 in which said base is duplicated to provide two bases each with a set of rails are symmetrically disposed on the opposite sides of a an assembly comprising said main actuator, and two double-sided clamps.

17. A linear incremental motor per claim 2 in which each side of said double-sided clamp has a set of rails, said sets of rails being interdigitated with said sets of rails on said two bases.

18. A linear incremental motor per claim 2 in which said double-sided clamp includes in its center said auxiliary actuator.

19. A linear incremental motor per claim 2 in which said auxiliary actuator is retained in its place by two set screws, one on each side.

20. A linear incremental motor per claim 1 in which said base with said second set of rails and said clamps with said first set of rails are made of material selected from the group consisting of silicon, silicon carbide, and metal.

* * * * *